(12) United States Patent
Ragessi (10) Patent No.: US 7,890,206 B2
(45) Date of Patent: Feb. 15, 2011

(54) AUTOMATED STORE AND RELATIVE STORAGE METHOD

(75) Inventor: Giovanni Ragessi, Oderzo (IT)

(73) Assignee: RGS Automazioni Srl, Motta Di Livenza (IT)

(*) Notice: Subject to any disclaimer, the term of this patent is extended or adjusted under 35 U.S.C. 154(b) by 747 days.

(21) Appl. No.: 11/604,115

(22) Filed: Nov. 24, 2006

(65) Prior Publication Data

US 2007/0116544 A1 May 24, 2007

(30) Foreign Application Priority Data

Nov. 24, 2005 (IT) .......................... UD2005A0199

(51) Int. Cl.
*G06F 7/00* (2006.01)
*B65G 61/00* (2006.01)
(52) U.S. Cl. ................... 700/214; 700/213; 414/801
(58) Field of Classification Search ........... 700/214, 700/217, 216, 213, 228; 414/791.6, 792.7, 414/791.4, 792.9, 793, 793.1, 794.4, 801, 414/802
See application file for complete search history.

(56) References Cited

U.S. PATENT DOCUMENTS

| 5,397,211 | A | 3/1995 | Lloyd et al. |
| 5,473,545 | A | 12/1995 | Schausten |
| 6,089,819 | A * | 7/2000 | Barnes .................... 414/794.7 |
| 6,728,597 | B2 * | 4/2004 | Didriksen et al. .......... 700/243 |
| 7,266,422 | B1 * | 9/2007 | DeMotte et al. ............ 700/217 |
| 2004/0220694 | A1 * | 11/2004 | Stingel et al. .............. 700/216 |
| 2008/0228316 | A1 * | 9/2008 | Stevens et al. ............. 700/217 |

FOREIGN PATENT DOCUMENTS

| CH | 680212 | 7/1992 |
| DE | 4320402 | 12/1994 |
| DE | 19507479 | 9/1996 |
| DE | 19507480 | 9/1996 |
| DE | 19509951 | 9/1996 |
| EP | 0099260 | 1/1984 |
| GB | 1254387 | 11/1971 |
| IT | 1310573 | 11/1996 |
| JP | 8-290805 | 11/1996 |

* cited by examiner

*Primary Examiner*—Gene Crawford
*Assistant Examiner*—Ramya Prakasam
(74) *Attorney, Agent, or Firm*—Hamre, Schumann, Mueller & Larson, P.C.

(57) ABSTRACT

An automated store comprising at least a plurality of shelves, on which objects are able to be disposed, and a transfer device able to move each of said objects towards a specific shelf; the transfer device comprises a supporting base, able to be disposed aligned and co-planar with each of said shelves, on which each object is able to be temporarily disposed; the automated store also comprises translation means able to thrust at least one object at a time from the supporting base to the specific fixed shelf and vice versa, and electronic command and control means, able to define a position of temporary collocation for the objects on the supporting base, according to the destination of the objects on the specific fixed shelf, in order to allow the translation means to thrust the objects into a corresponding storage position on the specific fixed shelf (aligned with said position of temporary collocation.

26 Claims, 6 Drawing Sheets fig. 3 fig. 4 fig. 5 fig. 6 fig. 7 fig. 8 fig.10 fig.12 fig.9 fig.11 fig.13 fig. 14 fig.15

AUTOMATED STORE AND RELATIVE STORAGE METHOD

FIELD OF THE INVENTION

The present invention concerns an automated store by means of which it is possible to store objects having at least a substantially plane lower surface, also of different shapes and sizes, optimizing the storage spaces.

BACKGROUND OF THE INVENTION

Different types of automated stores for storing objects are known, for example of the type disclosed by the Italian patent no. 1310573 in the name of the Applicant, comprising a plurality of towers provided with shelves, in which the objects are able to be stored, and a transfer device, movable horizontally, provided with lifting and translation members by means of which it is able to dispose the various objects on said shelves and to pick up said objects when they have to be discharged from the store.

The limitation of such known automated stores is that the disposition of the objects on the shelves for which they are intended occurs in such a manner as to create a lot of empty spaces between one object and the other, and hence determines a considerable reduction in the storage capacity of the store.

Moreover, from CH-A-680 212 it is known an automated store wherein a horizontal endless chain conveyor is mounted on a movable plane which is disposable along the storage bay and at any shelf height. A transfer unit above the conveyor moves the bundles from the trays of the endless chain to the selected shelf and vice versa. This known automatic store is cumbersome and complicated and cannot permit to contemporaneously transfer a plurality of objects from the movable plane to any shelf and vice versa.

One purpose of the present invention is to achieve an automated store which will allow to store a plurality of objects having at least a substantially plane lower surface, also of different shapes and sizes, on the relative shelves, so as to optimize the storage spaces and to exploit the capacity of the store to the utmost.

Another purpose of the present invention is to achieve an automated store of the above type, which is structurally simple and functionally effective and reliable, and which allows to store the objects in such a manner as to form homogeneous lots, for example according to their final destination.

The applicant has devised and embodied the present invention to overcome the shortcomings of the state of the art in order to achieve these purposes and obtain other advantages.

SUMMARY OF THE INVENTION

The present invention is set forth and characterized essentially in the main claims, while the dependent claims describe other innovative characteristics of the invention.

The automated store according to the present invention comprises a plurality of shelves, of the fixed type and each having a determinate surface, on which the objects to be stored are able to be disposed, and a transfer device, able to displace each of said objects towards a specific shelf, provided with a supporting base able to be disposed aligned and co-planar with each of the shelves.

In particular, on the supporting base, which has a surface, or at least a longitudinal dimension, which is substantially equal to that of every shelf, each object is able to be disposed temporarily during its displacement towards the shelf for which it is intended.

The transfer device advantageously comprises translation means able to thrust at least one object at a time from the supporting base to the specific shelf on which it is to be stored, and vice versa.

According to a variant, at least a part of said translation means are associated with the shelves.

The automated store according to the present invention also comprises electronic command and control means able to define a position of temporary collocation of the objects on the supporting base according to their destination on the specific shelf and which controls said translation means to thrust said objects onto the relative fixed shelf, in such a manner that the longitudinal edge of said objects facing towards said supporting base is substantially aligned with the longitudinal edge of said fixed shelf facing towards said supporting base.

Advantageously, the electronic command and control means comprise at least a memorization unit in which the sizes of each of the objects to the stored, and the storage positions of the objects already disposed on the shelves, are able to be memorized.

In this way, the electronic command and control means defines the position of temporary collocation of the objects to be stored according to their storage position on the specific shelf, so that in the storage position they do not interfere with possible other objects already disposed on the same specific shelf.

In a preferential embodiment, the translation means is able to thrust each object on the relative shelf, so that a longitudinal edge thereof finds itself aligned with the longitudinal edge of the shelf facing towards the supporting base.

The storage of other objects on the same shelf is subsequently evaluated by the electronic command and control means, according to the transverse and longitudinal sizes of the objects to be stored and the overall bulk of the objects already present on the shelf.

More in particular, where possible, the objects are located transversely adjacent, in the same row, on the intended shelf, with the new object to the stored which thrusts the other objects located on the same shelf, until its longitudinal edge is aligned with the longitudinal edge of said shelf.

If this is not possible, the new object to be stored is located longitudinally adjacent, in a new row, with the other objects already present on the shelf.

If the longitudinal size of the new object to be stored does not even allow it to be located longitudinally adjacent to the other objects, the new object is stored on another shelf chosen by the electronic command and control means from among those where said object may possibly be intended.

BRIEF DESCRIPTION OF THE DRAWINGS

These and other characteristics of the present invention will become apparent from the following description of a preferential form of embodiment, given as a non-restrictive example with reference to the attached drawings wherein.

DESCRIPTION OF A PREFERENTIAL FORM OF EMBODIMENT OF THE INVENTION

With reference to the attached drawings, the number 10 denotes in its entirety an automated store according to the present invention by means of which it is possible to provide to store objects 20, of variable sizes, having at least a substantially plane lower surface, in this case consisting of boxes of a parallelepiped shape.

The automated store 10 comprises four towers 11, each provided with a plurality of horizontal shelves 12 one above the other, a transfer device 13, a first conveyor belt 14, a second conveyor belt 15, a third conveyor belt 16 and a fourth conveyor belt 17.

The conveyor belts 14, 15, 16 and 17 have a width substantially equivalent to the width $L_2$ of the shelves 12 and a direction of advance parallel to the length $L_1$, of the shelves 12.

The four towers are disposed two by two aligned with each other on opposite sides with respect to a track 18 along which the transfer device 13 is able to move.

The first conveyor belt 14 extends for a part 14a outside and for another part 14b inside an inlet tower 11a, advantageously at the height of the lower shelves 12.

Between the two parts 14a and 14b there is a first photocell 19, associated with a digital encoder, able to determine the entity of the advance of the first conveyor belt 14, the function of which will be explained hereafter.

More in particular, the first photocell 19 is disposed on an axis X aligned with the left transverse edge 12a of the shelves 12 located above the part 14b of the conveyor belt 14.

Upstream of the first photocell 19 a bar code reader is advantageously present.

The second conveyor belt 15 extends, at the height of the lower shelves 12, for a part 15a inside an outlet tower 11b and for another part 14b outside the tower 11b, in a position adjacent to the third conveyor belt 16.

Between the second conveyor belt 15 and the third conveyor belt 16 there is a second photocell 21, also associated with a relative encoder able to determine the entity of the advance of the second conveyor belt 15, as will be described hereafter.

The third conveyor belt 16 extends as an extension of the second conveyor belt 15 and is provided with a thruster bar 27, having a length substantially equivalent to that of the third conveyor belt 16 and able to move in a direction orthogonal to the direction of advance of the latter.

The fourth conveyor belt 17 is disposed substantially parallel and adjacent to the third conveyor belt 16.

The transfer device 13 comprises a slider 22, able to slide along the tracks 18 to move in a direction parallel to the length $L_1$, of the shelves 12, and a frame 23, mounted on the slider 22, which extends as far as above the towers 11.

On the frame 23 a supporting base 24 is mounted, able to be moved vertically, by suitable actuator members of a substantially known type, to be disposed selectively in a position co-planar with the shelves 12.

The supporting base 24 has a conformation and surface substantially equal to that of the shelves 12 and is able, according to the position assumed by the slider 22, to be disposed adjacent to and aligned with the shelves 12.

Two telescopic supports 25 are associated with the supporting base 24, at the ends of which two translation bars 26 are able to be constrained, each of which is able to assume a lowered position, interfering with the objects 20, and a raised position, not interfering with the objects 20.

More in particular the two translation bars 26 are disposed on opposite sides of the supporting base 24, in order to cooperate respectively with the towers 11 located on one side and the other side of the supporting base 24.

Advantageously the two translation bars 26 are associated with guides 29, of the cable or chain type, able to move them in coordination with each other, so that when one translation bar 26 is in the lowered position, the other translation bar 26 is in the raised position.

The telescopic supports 25 are able to selectively extend in both directions, to take the lowered translation bar 26 in correspondence with the outer edge, that is, the edge farthest from the supporting base 24, of the shelves.

Figure 14:
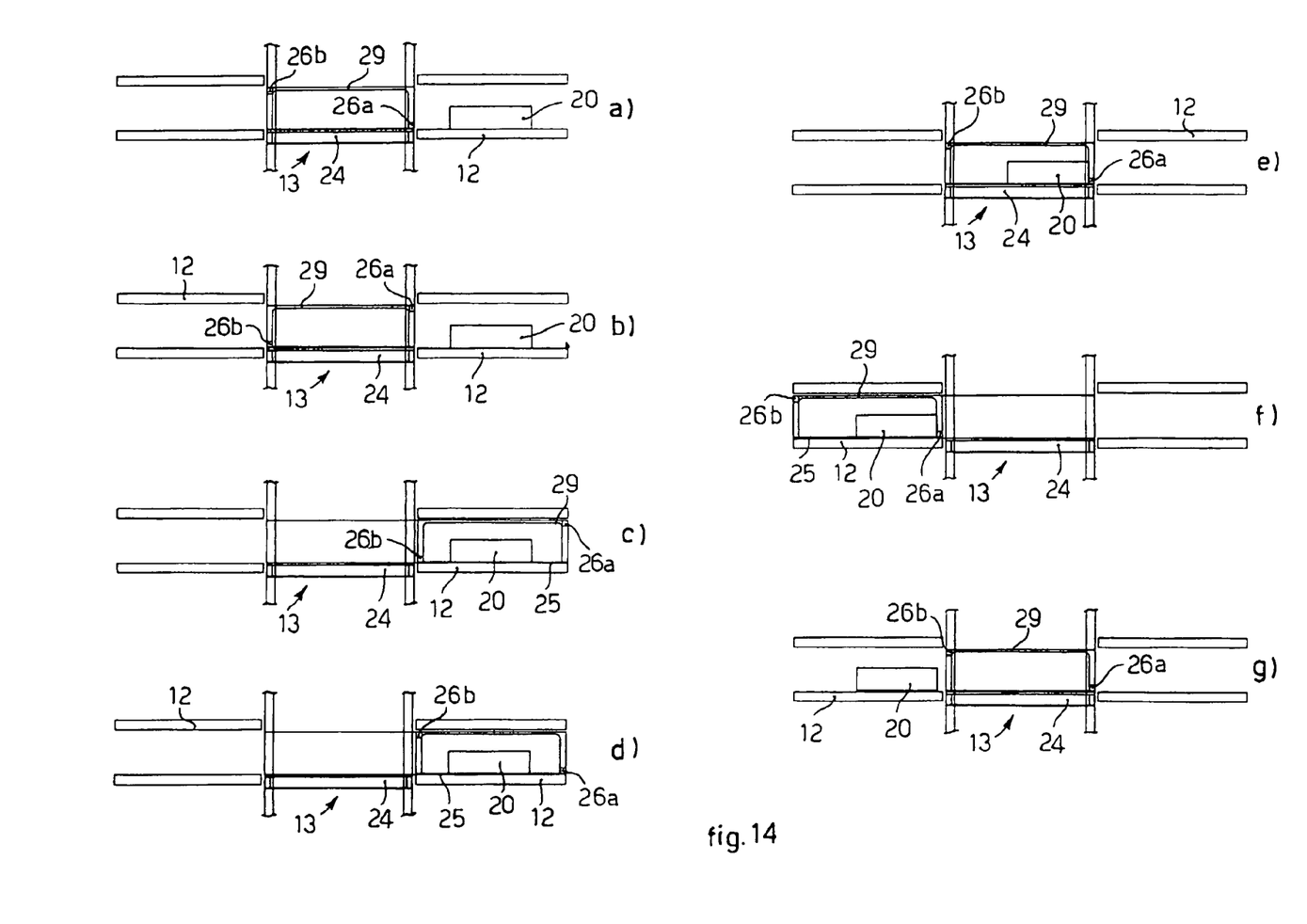
FIG. 14 is a schematic and sectioned view of the transfer device during the pick up and positioning of the objects.

FIG. 14 shows schematically a pick up step and a positioning step of an object 20 by means of the transfer device 13.

In order to pick up an object 20 from a shelf 12, or from the first conveyor belt 14, the slider 22 moves with the supporting base 24 into alignment and a position co-planar with said shelf 12; a first translation bar 26a, facing towards the shelf 12, initially in a lowered position (FIG. 14a), is raised (FIG. 14b).

Then the telescopic supports 25 are extended, moving above the shelf 12 (FIG. 14c) and the first translation bar 26a is lowered (FIG. 14d) so as to bestride the object 20 to be picked up.

The telescopic supports 25 are then retracted and the first translation bar 26a, constrained to it, thrusts the object 20 onto the supporting base 24, thus completing the pick-up operation (FIG. 14e).

The positioning of the object 20 on a shelf 12 is performed, with the supporting base 24 aligned and in a position co-planar with said shelf 12, in this case by raising the second translation bar 26b, facing towards the same shelf 12, and by lowering the first translation bar 26a in order to constrain it to the telescopic supports 25 (FIG. 14e).

Then the telescopic supports 25 are first extended, so that the first translation bar 26a thrusts the object onto the shelf 12 (FIG. 14f), and then retracted so as to return the translation bars 26a and 26b onto the slider 22 (FIG. 14g).

According to a variant, there are two pairs of telescopic supports 25 associated with relative independent translation bars 26, each able to act on the towers 11 located on a relative side of the transfer device 13.

The transfer device 13, the movement members of the conveyor belts 14, 15, 16 and 17, the bar code reader, the encoders associated with the photocells 19 and 21, and the thruster bar 27 are connected to a command and control unit of an electronic type, not shown, provided with memory units in which the sizes, at least in length "a" and width "b", of each type of object 20 are memorized, and also the displacements of the first conveyor belt 14 and of the transfer device 13 for the consequent determination of the spaces occupied by the objects 20 on the shelves 12.

In the following description, by length "a" and width "b" of the objects 20 we define respectively the sizes occupied in a longitudinal direction, that is, of the length $L_1$, and transverse, that is, the width $L_2$, of the shelves 12.

The command and control unit is able to manage automatically the coordinated functioning of the automated store 10 as described hereafter.

The objects 20 are fed, with a desired cadence, through the first conveyor belt 14, and the relative bar code is read by the appropriate reader, which sends the information to the command and control unit in order to determine at least the size of the object 20 in transit at that moment.

The passage of the object 20 in front of the first photocell 19 determines the longitudinal bulk, that is, the length "a", of said object 20, and hence its orientation on the first conveyor belt 14.

This information, together with the bar code previously acquired, allows the command and control unit to identify the shelf 12 for which the object 20 is intended and to establish the storage position where said object 20 must be disposed on the relative shelf 12, in particular the distance "D" from a reference transverse edge, in the drawings the left transverse edge 12a of said shelf 12.

The distance "D" is determined so as to be as small as possible, in order to allow the object 20 to be stored without interference with the structure of the towers 11 and/or with other objects already present on the shelf 12, as will be clarified hereafter. For this reason, when an object 20 must be disposed on an empty shelf 12, the distance "D" is advantageously just a little more than the longitudinal size of the uprights of the towers 11.

The command and control unit is thus able to calculate the entity of the advance that the first conveyor belt 14 has to make in order to take the object 20 to a desired pick-up position, on the same first conveyor belt 14, and a position of temporary collocation, on the supporting base 24, correlated to the storage position identified and hence to said distance "D".

As soon as the rear transverse edge 20a of the object 20 has passed in front of the first photocell 19, and hence the entire object 20 has passed before it, the encoder starts to detect the feed of the first conveyor belt 14, supplying the information to the command and control unit; when the encoder has measured an advance of the first conveyor belt 14 equal to the distance "D", the command and control unit immediately determines the stoppage of said first conveyor belt 14.

In this condition the object 20 finds itself in the exact pick-up position, with its rear edge 20a located at distance "D" from the axis X.

The transfer device 13 is then moved so as to take the supporting base 24 in alignment with the shelves 12 of the first tower 11a and co-planar with the first conveyor belt 14, hence with its left transverse edge 24a aligned with the axis X.

By means of one of the two translation bars 26, the object 20 is then drawn and made to slide transversely on the lower plane surface until it is taken onto the supporting base 24, in the position of temporary collocation wherein its rear transverse edge 20a finds itself always at distance "D" from the left transverse edge 24a.

Then the transfer device 13 is moved so as to take the supporting base 24 co-planar and in alignment with the shelf 12 to which the object 20 is intended.

Figure 8:
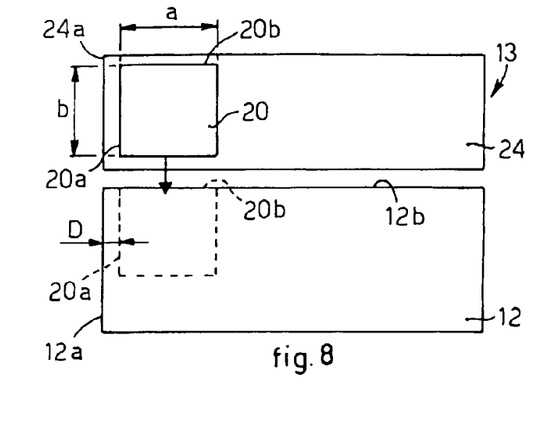
FIGS. 8, 9, 10, 11 and 12 are variants of FIG. 6.

In this condition, the object 20 is thrust and made to slide transversely by means of the appropriate translation bar 26 until it is disposed completely resting on the shelf 12, in the storage position wherein its rear transverse edge 20a is located at distance "D" from the left transverse edge 12a of said shelf and its longitudinal edge 20b, facing the supporting base 24, is substantially aligned with the corresponding longitudinal front edge 12b of the shelf 12 (FIG. 8).

According to the displacements of the transfer device 13, the distance "D" and the size of the object 20, the command and control unit memorizes the position and the storage space occupied by the object 20 on the shelf 12.

Then the transfer device 13 is moved to return the supporting base 24 to a position co-planar with the first conveyor belt 14 in order to pick up another object 20.

The new object 20 is made to advance on the first conveyor belt 14 until it reaches a pick-up position determined by the command and control unit so that, in its subsequent storage position on the intended shelf 12, it does not interfere with the other objects 20 present on the same shelf 12.

Figure 9:
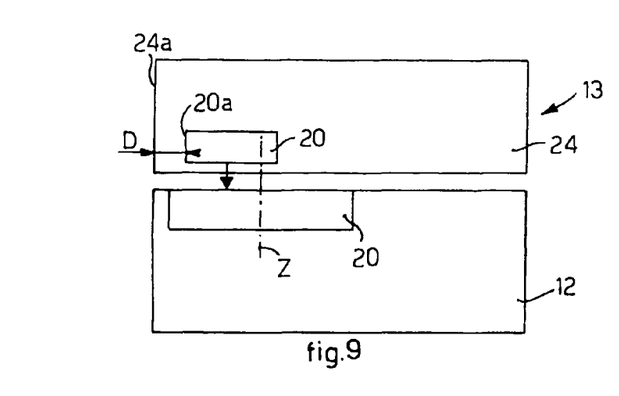
Figure 10:
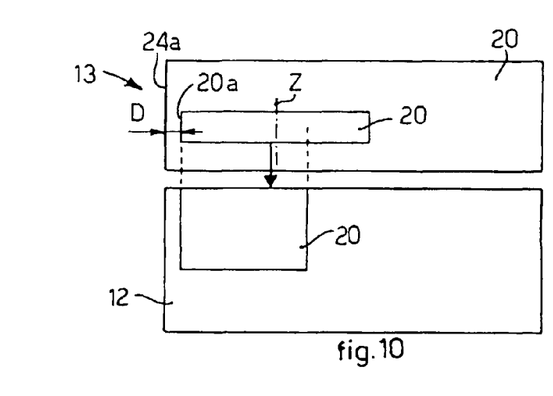
Figure 11:
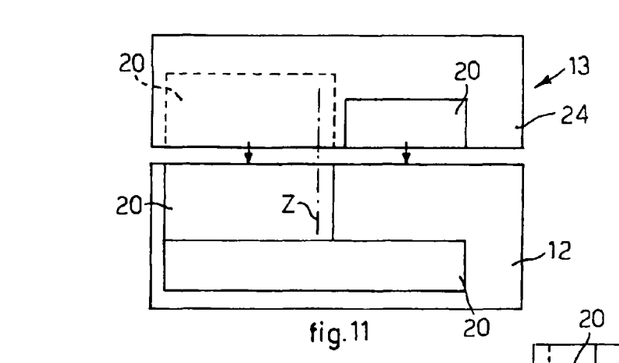

If the new object 20 can be placed transversely adjacent to the object 20 already on the shelf 12, because the sum of the widths "b" of said objects 20 is less than or equal to the width $L_2$ of the shelf, the pick-up position and the distance "D", and hence the position of temporary collocation of the new object 20, are defined so that, in the storage position, the transverse plane "Z" passing through the center of the object 20 of greater length "a" intersects the object having a smaller length "a" (FIGS. 9, 10 and 11).

In this way, the new object is transferred by the appropriate translation bar 26 onto the shelf 12 as indicated previously, thrusting the object 20 already present on said shelf.

Figure 1:
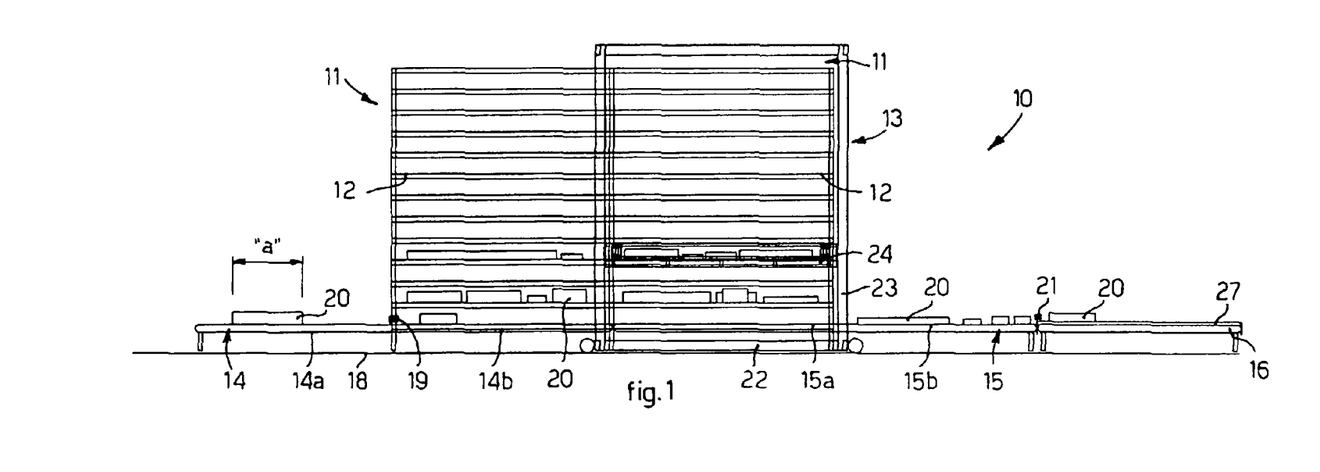
FIG. 1 is the front view of an automated store according to the present invention.
Figure 2:
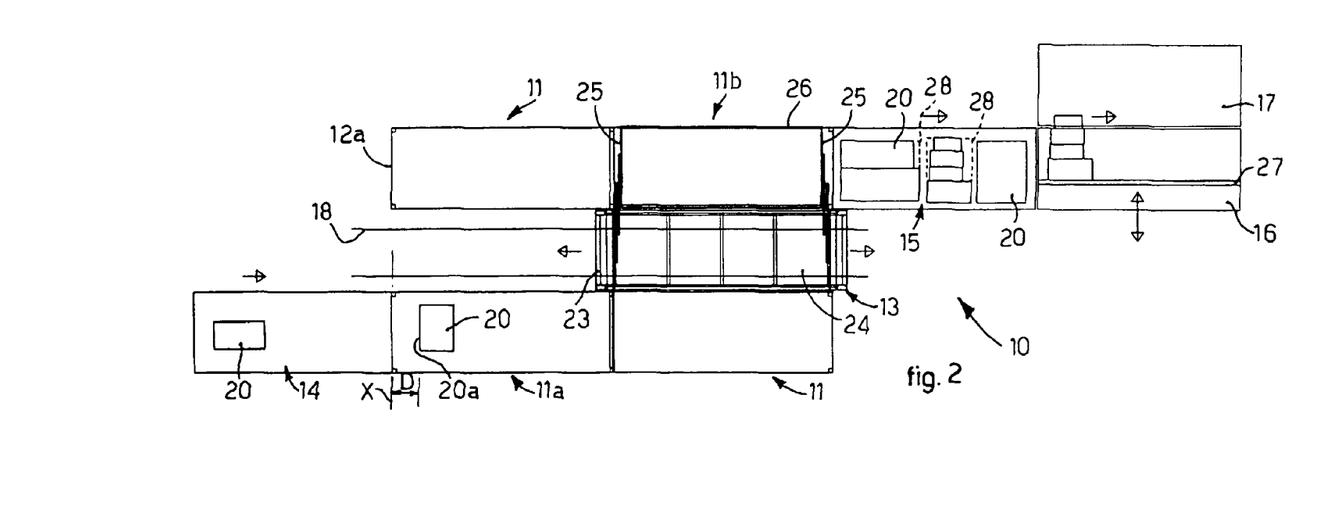
FIG. 2 is a plane view of the automated store in FIG. 1.
Figure 3:
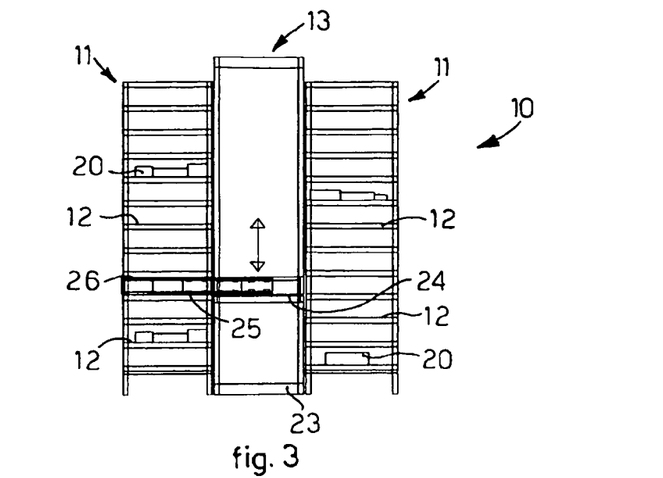
FIG. 3 is a lateral view of the automated store in FIG. 1.
Figure 4:
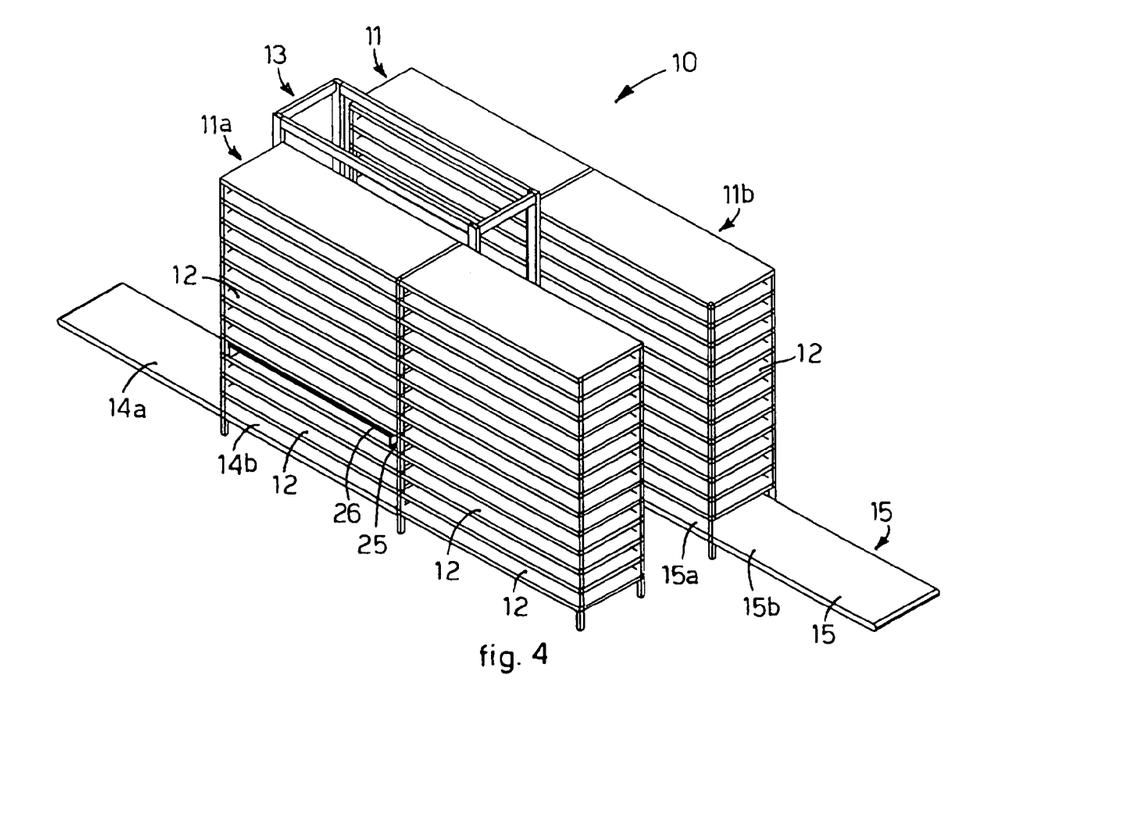
FIG. 4 is a partial three-dimensional view of the automated store in FIG. 1.
Figure 5:
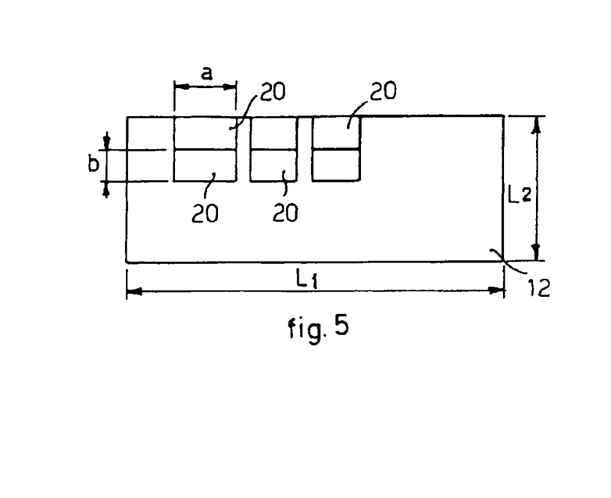
FIG. 5 is a plane schematic view of a shelf of the automated store in FIG. 1.
Figure 6:
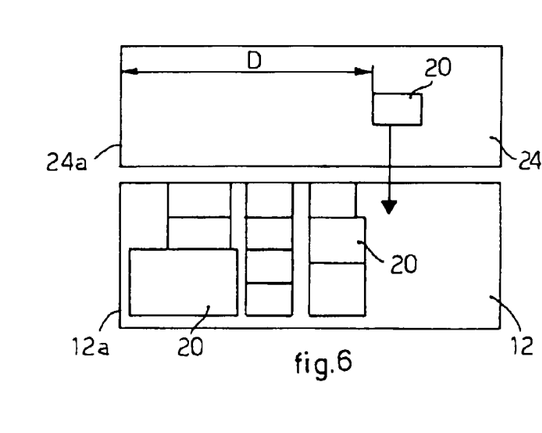
FIG. 6 is a schematic view of the shelf in FIG. 5 during the positioning of an object by the transfer device.
Figure 7:
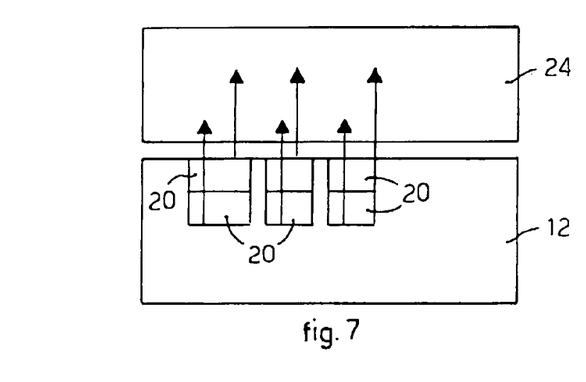
FIG. 7 is a schematic view of the shelf in FIG. 5 during the pick up of the objects disposed thereon by the transfer device.

On the contrary, if the new object 20, in consideration of its size, cannot be located transversely adjacent to the object 20 already present on the shelf 12, the command and control unit determines a pick-up position, and a position of temporary collocation, and then calculates the distance "D", in such a manner that the new object 20 is positioned longitudinally adjacent to the object or objects 20 already present on the shelf 12 (FIGS. 6 and 11).

Advantageously, in determining the position of temporary collocation, a new object 20 can be located respectively adjacent transversely and longitudinally to two objects 20 already present on a shelf 12 only if said new object 20 has a width "b" less than the object 20 with which it must be located longitudinally adjacent (FIG. 11); this is to prevent, both during the positioning step and also during the pick-up step, any thrust between the objects 20 from determining a disconnected rotation thereof.

Figure 12:
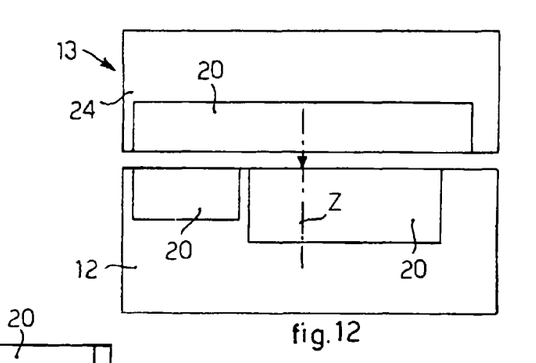

For the same reason, a new object 20 can be disposed on a shelf on which two or more objects 20 are already present only if of these last two the widest object 20 is intersected by the transverse plane "Z" passing through the baricenter of the new object 20 (FIG. 12).

Figure 13:
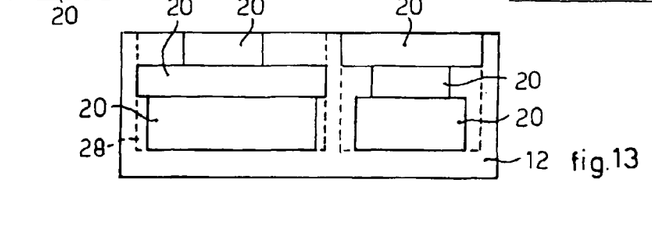
FIG. 13 is a schematic view of the shelf in FIG. 5 in the full condition.

If the objects 20 already present on a shelf 12 occupy only a part of the length L, of said shelf 12, in order to determine the spaces occupied by the objects 20, and hence the pick-up position, the position of temporary collocation and storage of a new object 20, the command and control unit considers the objects 20 transversally adjacent to each other on said shelf 12 as a single virtual object 28 having as a width the sum of the widths "b" of said objects 20 and as a length the greatest of the lengths "a" of said objects 20 (FIG. 13).

When the new object 20 cannot be stored on a determinate shelf 12 due to lack of space, the same object 20 is stored on a different shelf 12, chosen by the command and control unit from those to which said specific object 20 may possibly be intended.

The objects 20 present on a shelf 12 are discharged by means of the transfer device 13 as follows.

The supporting base 24 is aligned and taken to a position co-planar with the shelf 12 to be emptied; the telescopic supports 25 are extended taking the necessary translation bar 26, in its raised position, beyond the objects 20.

Then the translation bar 26 is lowered and the telescopic supports 25 are made to return so as to draw all the objects 20 present on the shelf 12 onto the supporting base 24.

Subsequently, the supporting base 24 is aligned and disposed co-planar with the portion 15a of the second conveyor belt 15 and the translation bar 26 thrusts the objects 20 onto said portion 15a.

The second conveyor belt 15 is then driven so as to convey the objects 20 onto the third conveyor belt 16, driven in turn.

In this step, according to necessity, the second conveyor belt 15 can be driven so as to convey without interruptions all the discharged objects 20, or only some of them defining a same virtual object 28.

As soon as the objects 20 or the virtual objects 28 pass in front of the second photocell 21, the relative encoder starts to detect the advance of the second conveyor belt 15, supplying the information to the command and control unit.

According to requirements, and knowing the longitudinal bulk of the objects 20 or virtual objects 28 to be transferred to the third conveyor belt 16, the command and control unit determines the stoppage when the last object 20 to be transferred is on the third conveyor belt 16.

If a single virtual object 28 has been transferred onto the third conveyor belt 16, the drive of the thruster bar 27 allows to progressively discharge the individual objects 20 belonging to said virtual object 28 through the fourth conveyor belt 17.

In fact, the command and control unit notes the composition and width "b" of the objects 20 belonging to the virtual object 28, determines the movement of the thruster bar 27, with variable pitch according to the width "b", so as to thrust a single object 20 at a time onto the fourth conveyor belt 17.

It is clear, however, that modifications and/or additions of parts or steps may be made to the automated store 10 as described heretofore and the relative storage method, without departing from the scope of the present invention.

For example, instead of the first conveyor belt 14 and/or the second conveyor belt 15, there may be respective pairs of conveyor belts having lengths equivalent to each of their parts 14a, 14b, 15a, 15b.

Or there may be transport means with horizontal feed of a different type.

Furthermore, the bar code reader may not be present, for example if there is a system present to identify the objects 20 upstream of the automated store 10.

Moreover, there may be a single translation bar 26 present on the transfer device 13, able to be guided from one side to the other of the supporting base 24.

Figure 15:
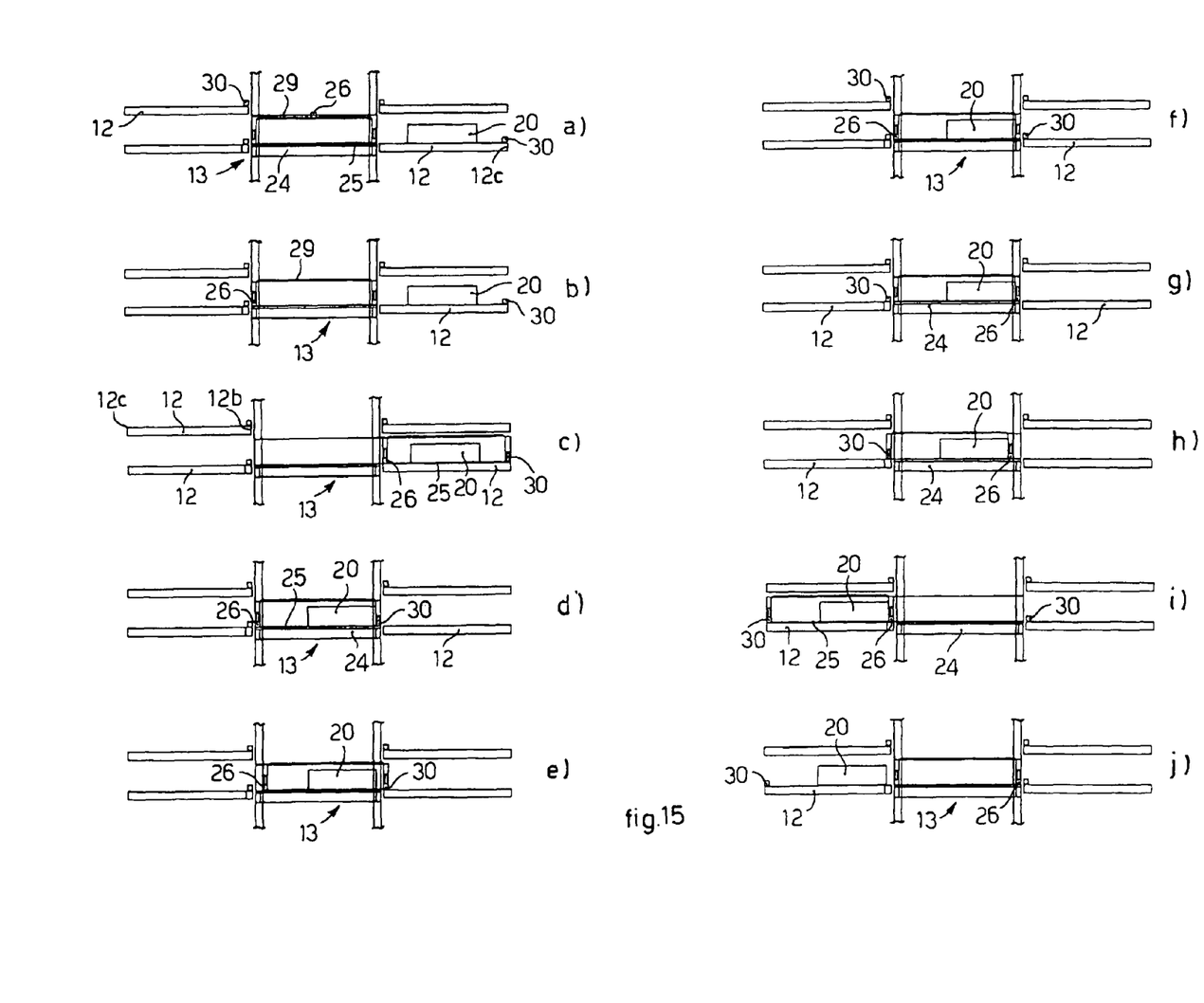
FIG. 15 shows a variant of FIG. 14.

In the variant shown schematically in FIG. 15, the transfer device 13 is provided with a single translation bar 26, by means of which the operations are effected to position the objects 20 on the shelves 12; each shelf 12 is also associated with a respective translation bar 30 by means of which the objects 20 are discharged from the shelf 12.

More in particular, the translation bar 26, moving in an upside-down U path along guides 29, is able to be disposed from one end to the other of the telescopic supports 25 in order to be constrained to them.

The translation bars 30, on the contrary, are mounted idle on respective substantially horizontal guides and are able to be attached to the ends of the telescopic supports 25, to be taken from an advance position, in correspondence with the front longitudinal edge 12b of the relative shelf 12, assumed when there are no objects 20 on the latter, to a retracted position, in correspondence with the rear longitudinal edge 12c of the relative shelf 12, when there are objects 20 on the shelf 12.

In order to pick up an object 20 located on a shelf 12 (FIG. 15a), the translation bar 26 is taken to the end of the telescopic supports 25 farthest from said object 20 (FIG. 15b); then the telescopic supports 25 themselves are extracted towards the object 20 and attach the translation bar 30 of said shelf 12 (FIG. 15c).

Then the telescopic supports 25 are first retracted, so that the translation bar 30 thrusts the object 20 onto the supporting base 24 (FIG. 15d), then slightly extracted, in order to return and detach the translation bar 30 on the relative shelf 12 (FIG. 15e), and finally retracted again (FIG. 15f).

In order to position on a shelf 12 an object 20 located on the supporting base 24, the translation bar 26 is taken and attached to the end of the telescopic supports 25 farthest from said shelf 12 (FIG. 15g); then the telescopic supports 25 themselves are extracted towards the shelf 12 so as to attach the translation bar 30 (FIG. 15h) and to thrust it into its retracted position, while simultaneously the translation bar 26 thrusts the object 20 onto said shelf 12 (FIG. 15i).

Finally the translation bar 30 is detached and the telescopic supports 25, with the translation bar 26 attached, are retracted (FIG. 15j).

In the steps when the telescopic supports 25 are extended, the translation bar 26 is always kept in the lowered position, which allows to contain the bulk in height of the transfer device 13 and thus to reduce the vertical distance between the shelves 12 with a consequent increase in the capacity of the automated store 10.

It is clear that, although the present invention has been described with reference to specific examples, a person of skill in the art shall certainly be able to achieve many other equivalent forms of automated store, and perfect analogous storage methods, having the characteristics as set forth in the claims and hence all coming within the field of protection defined thereby.

The invention claimed is:

1. An automated store for storing individual objects, comprising;
   a plurality of fixed shelves, on which said objects are able to be disposed,
   a transfer device able to move each of said objects towards a specific fixed shelf, wherein said transfer device comprises a supporting base which is able to be disposed aligned and co-planar with each of said fixed shelves, and which has at least a site substantially equal to the corresponding size ($L_1$) of each fixed shelf and on which each object is able to be temporarily disposed,
   translation means for thrusting one of said objects from said supporting base to said specific fixed shelf and vice versa, and
   electronic command and control means for identifying a position of temporary collocation for said objects on said supporting base, according to the destination of said objects on said specific fixed shelf, in order to allow said translation means to thrust said objects into a corresponding storage position on said specific fixed shelf aligned with said position of temporary collocation, and controlling said translation means to thrust said objects onto the relative fixed shelf such that a longitudinal edge of said objects facing towards said supporting base is substantially aligned with the longitudinal edge of said specific fixed shelf facing towards said supporting base.

2. The automated store as in claim 1, wherein said electronic command and control means comprises a memorization unit in which sizes of each of said objects to be stored on said fixed shelves, and storage positions of the objects already disposed on said fixed shelves, are memorized.

3. The automated store as in claim 1, wherein said electronic command and control means is able to identify said position of temporary collocation of said objects to be stored according to storage positions of said objects stored on said specific fixed shelf in order to avoid that said objects to be stored interfere with any of said objects already disposed on said specific fixed shelf.

4. The automated store as in claim 2, wherein, if on a specific fixed shelf on which a specific object is to be stored, other objects are present, said electronic command and control means determines a position of temporary collocation of said specific object by comparing the sum of transverse size (b) of said specific object and transverse sizes (b) of said other objects with transverse size ($L_2$) of said specific shelf.

5. The automated store as in claim 4, wherein, if the sum of the transverse size (b) of said specific object and the transverse sizes (b) of said other objects is less than the transverse size ($L_2$) of said specific fixed shelf, said translation means is able to thrust said specific object towards said other objects, displacing said other objects linearly, so as to locate said specific object transversely adjacent to said other objects.

6. The automated store as in claim 5, wherein said electronic command and control means determines the position of temporary collocation of said specific object so that the transverse plane (Z) passing through the baricenter of that object, of either said specific object or said other objects, with a greater longitudinal size (a), intersects that object, of either said specific object or said other objects, with a smaller longitudinal size (a).

7. The automated store as in claim 4, wherein, if the sum of the transverse size (b) of said specific object and the transverse sizes (b) of said other objects is greater than the transverse size ($L_2$) of said specific fixed shelf, said electronic command and control means determines the position of temporary collocation of said specific object to be stored by comparing the longitudinal size (a) of said specific object to be stored with the difference between the longitudinal size ($L_1$) of said specific fixed shelf and the overall longitudinal sizes of said other objects.

8. The automated store as in claim 7, wherein, if the longitudinal size (a) of said specific object to be stored is less than the difference between the longitudinal size ($L_1$) of said specific fixed shelf and the overall longitudinal sizes of said other objects, said translation means is able to thrust said specific object to be stored to the side of said other objects so as to locate said specific object to be stored longitudinally adjacent to said other objects.

9. The automated store as in claim 7, wherein, if the longitudinal size (a) of said specific object to be stored is more than the difference between the longitudinal size ($L_1$) of said. specific fixed shelf and the overall longitudinal sizes of said other objects, said electronic command and control means determines said position of temporary collocation of said specific object to be stored according to a storage position on a different fixed shelf.

10. The automated store as in claim 3, wherein, in the presence of a group of stored objects transversely adjacent to each other on a specific fixed shelf, occupying only a part of the length ($L_1$) of said specific fixed shelf, said electronic command and control means identifies the position of temporary collocation of said specific object to be stored considering said group of objects as a single virtual object having as transverse size of the single virtual object the sum of the transverse sizes (b) of said objects, and as longitudinal size the greatest of the longitudinal sizes (a) of said objects.

11. The automated store as in claim 1, further comprising first transport means with horizontal advance for feeding said objects to be stored towards said transfer device, with respect to which said supporting base is able to be disposed aligned and co-planar.

12. The automated store as in claim 11, wherein said electronic command and control means determines stoppage of said first transport means when said objects to be stored reach a pick-up position, aligned with said position of temporary collocation, in which said objects to be stored are able to be translated onto said supporting base by said translation means.

13. The automated store as in claim 12, wherein said electronic command and control means is connected to first sensor means for detecting transit of said objects to be stored on said first transport means in correspondence with a reference axis (X), and encoder means for detecting an amount of advance of said first transport means after passage of said objects to be stored in correspondence with said reference axis (X), in order to-determine stoppage thereof when said objects to be stored are at a determinate distance (D) from said reference axis (X) defining said pick-up position.

14. The automated store as in claim 13, wherein when said supporting base is aligned with said first transport means, a transverse edge of said supporting base is disposed in alignment with said reference axis (X).

15. The automated store as in claim 13, wherein said objects to be stored are associated with a relative bar code, and wherein said electronic command and control means is connected to bar code reader means, disposed upstream of said first sensor means, wherein some data of said objects to be stored is identified, such as size, lot, type of construction.

16. The automated store as in claim 1, wherein said fixed shelves are disposed at different heights, and wherein said transfer device comprises slider means to be selectively driven to take said supporting base to alignment with each of said fixed shelves, and lifting means mounted on said slider means, to be selectively driven to take said supporting base to a position co-planar with each of said fixed shelves.

17. The automated store as in claim 1, wherein said translation means is mounted on said transfer device to selectively assume a lowered position and a raised position in order respectively to interfere or not interfere with said objects.

18. The automated store as in claim 1, wherein said translation means comprises a bar, substantially parallel to the longitudinal size ($L_1$) of said fixed shelves and of said supporting base, and having telescopic arms able to move the bar transversely.

19. The automated store as in claim 17, wherein said fixed shelves are disposed on opposite rows with respect to said transfer device, and wherein said translation means comprises a pair of bars each: of which facing towards a row of said fixed shelves.

20. The automated store as in claim 1, wherein part of said translation means is associated with said fixed shelves.

21. The automated store as in claim 1, wherein said translation means is able to displace simultaneously all the objects stored on a specific fixed shelf in order to dispose them on said supporting base.

22. The automated store as in claim 11, further comprising second transport means, with horizontal advance, with respect to which said supporting base is able to be aligned and disposed co-planar, on which said translation means is able to displace said objects so said objects can be discharged.

23. The automated store as in claim 22, further comprising third transport means associated with relative thrust means on which said objects can be conveyed by said second transport means, and fourth transport means, adjacent to said third transport means, on which said objects can be individually transferred by means of said thrust means.

24. The automated store as in claim 23, further comprising second sensor means able to detect the passage of said objects from said second transport means to said third transport means.

25. A method to store individual objects on a plurality of fixed shelves, each having a determinate surface, by means of a transfer device able to displace each of said objects towards a specific fixed shelf, under control of electronic command and control means, the method comprising     disposing each specific object on a supporting base of said transfer device, able to be aligned and to be co-planar with each of said fixed shelves, in a position of temporary collocation determined according to the destination of the specific object on said specific fixed shelf;

moving said supporting base to a position aligned and co-planar with said specific fixed shelf; and     thrusting said object, by means of translation means, to a relative storage position on said specific fixed shelf aligned with said position of temporary collocation, in such a manner that a longitudinal edge of said objects facing towards said supporting base is substantially aligned with a longitudinal edge of said fixed shelf facing towards said supporting base.

26. The method as in claim 25, comprising, upstream of said steps, the following further steps;

disposing said specific object in a pick-up position aligned with said position of temporary collocation;

thrusting said specific object by means of said translation means, and moving said specific object from said pick-up position to said position of temporary collocation.

\* \* \* \* \*